(12) United States Patent
Baudart

(10) Patent No.: US 10,967,916 B2
(45) Date of Patent: Apr. 6, 2021

(54) CROSS-VEHICLE BEAM WITH HIDDEN BRACE FOR MOTOR VEHICLE

(71) Applicant: FAURECIA INTERIEUR INDUSTRIE, Nanterre (FR)

(72) Inventor: Laurent Baudart, Fresnoy en Thelle (FR)

(*) Notice: Subject to any disclaimer, the term of this patent is extended or adjusted under 35 U.S.C. 154(b) by 0 days.

(21) Appl. No.: 16/044,277

(22) Filed: Jul. 24, 2018

(65) Prior Publication Data

US 2019/0031247 A1    Jan. 31, 2019

(30) Foreign Application Priority Data

Jul. 26, 2017   (FR) ...................................... 17 57115

(51) Int. Cl.
*B62D 21/15*    (2006.01)
*B62D 25/14*    (2006.01)

(52) U.S. Cl.
CPC ......... *B62D 25/145* (2013.01); *B62D 25/142* (2013.01); *B62D 21/15* (2013.01)

(58) Field of Classification Search
CPC .... B62D 25/14; B62D 25/142; B62D 25/145; B62D 21/15
USPC ............................ 296/193.02, 70, 72; 180/90
See application file for complete search history.

(56) References Cited

U.S. PATENT DOCUMENTS

| | | | | |
|---|---|---|---|---|
| 3,798,994 A * | 3/1974 | Hollins | ................ | B60R 21/045 74/492 |
| 3,876,228 A * | 4/1975 | Hawkins | ............... | B60R 21/045 280/752 |
| 4,317,582 A * | 3/1982 | Cottin | .................... | B62D 25/14 180/90 |
| 4,671,536 A | 6/1987 | Yoshimura | | |
| 5,538,309 A * | 7/1996 | Murray | .................. | B60J 5/0473 296/146.9 |
| 6,517,114 B1 * | 2/2003 | Scheib | ................. | B62D 25/142 180/90 |
| 2008/0048470 A1 * | 2/2008 | Vican | ................... | B62D 25/145 296/193.02 |
| 2009/0174216 A1 * | 7/2009 | Penner | .................. | B60K 37/00 296/72 |
| 2009/0174223 A1 * | 7/2009 | Penner | .................. | B60K 37/00 296/193.02 |

(Continued)

FOREIGN PATENT DOCUMENTS

| | | |
|---|---|---|
| CN | 202368383 U | 8/2012 |
| DE | 102012212710 A1 | 1/2013 |

(Continued)

OTHER PUBLICATIONS

Computer translation of WO 2013/182525 (Year: 2013).*

(Continued)

*Primary Examiner* — Gregory A Blankenship
(74) *Attorney, Agent, or Firm* — Reising Ethington P.C.

(57) ABSTRACT

A cross-vehicle beam for a vehicle comprises a tubular portion extending in a longitudinal direction (X), a first brace connected to the tubular portion and intended to be fixed to a windshield lower crossmember of the body of the vehicle, and a second brace connected to the tubular portion and intended to be fixed to a bulkhead of the body of the vehicle. The ends of the first and second braces at the tubular portion are located in the same transverse plane (P1) of the tubular portion.

20 Claims, 5 Drawing Sheets

(56) References Cited

U.S. PATENT DOCUMENTS

| | | | | |
|---|---|---|---|---|
| 2011/0227369 A1* | 9/2011 | Abe | ................ | B62D 21/15 296/193.02 |
| 2011/0278876 A1* | 11/2011 | Hitz | ................ | B62D 25/145 296/72 |
| 2012/0032044 A1* | 2/2012 | Ruiz Rincon | ........ | B62D 25/145 248/205.3 |
| 2012/0038181 A1 | 2/2012 | Yamazaki | | |
| 2012/0049573 A1* | 3/2012 | Atsumi | ................ | B62D 25/145 296/193.02 |
| 2013/0076016 A1* | 3/2013 | Aoki | ................ | B62D 1/16 280/779 |
| 2013/0241235 A1* | 9/2013 | Baudart | ................ | B62D 25/147 296/193.02 |
| 2014/0252793 A1* | 9/2014 | Arzoumanian | ...... | B62D 25/145 296/72 |
| 2015/0298720 A1* | 10/2015 | Nakane | ................ | B62D 1/16 280/779 |
| 2015/0344080 A1* | 12/2015 | Davos | ................ | B62D 29/001 296/205 |
| 2016/0229365 A1* | 8/2016 | Abe | ................ | B62D 25/145 |
| 2018/0050730 A1* | 2/2018 | Abe | ................ | B62D 25/08 |
| 2019/0031247 A1* | 1/2019 | Baudart | ................ | B62D 25/145 |

FOREIGN PATENT DOCUMENTS

| | | | | |
|---|---|---|---|---|
| EP | 1388487 A2 | 2/2004 | | |
| EP | 2716526 A1 | 4/2014 | | |
| JP | 2005255045 A | 9/2005 | | |
| JP | 2005255046 A | 9/2005 | | |
| WO | WO 2013/182525 | * 12/2013 | ............. | B62D 25/14 |

OTHER PUBLICATIONS

French Search Report for FR application No. 1757115, with English translation, dated Jun. 27, 2018, 4 pages.

Written Opinion on Patentability of the Invention for FR application No. 1757115 in English, dated Jun. 27, 2018, 4 pages.

* cited by examiner

CROSS-VEHICLE BEAM WITH HIDDEN BRACE FOR MOTOR VEHICLE

TECHNICAL FIELD

The present invention relates to a dashboard cross-member of motor vehicle, or cross-car beam (CCB), more generally to a cross-vehicle beam. The invention also relates to a vehicle dashboard assembly comprising such a cross-vehicle beam and to a vehicle comprising such a dashboard assembly.

DESCRIPTION OF PRIOR ART

Known from the prior art is a cross-vehicle beam 1 for a motor vehicle as shown in FIG. 1. Such a cross-vehicle beam 1 connects the dashboard to the body of the motor vehicle. Such a cross-vehicle beam 1 also has a safety function, absorbing some of the energy in the event of a frontal impact causing deformation of the car body, to limit deformation of the dashboard.

Such a cross-vehicle beam 1 is generally fixed to the lateral uprights of the body of the motor vehicle at the floor of the body, by its two longitudinal ends 2, 3, and to the windshield lower crossmember (or "windshield opening lower cross member" from French "traverse inférieure de baie") at the vertical of the steering column.

To do this, the beam 1, shown in FIG. 1, comprises a brace 4 intended to be fixed to the body of the motor vehicle at the floor. The brace 4 is an arm extending transversely from a tubular portion 5 of the beam 1, extending between the two ends 2, 3 of the beam 1. This brace 4 extends to the floor.

Such a brace 4 occupies significant space. In particular, as is particularly visible in FIG. 2, this brace 4 extends into the passenger compartment of the motor vehicle. Also, for this brace 4 not to be visible to the occupants of the motor vehicle, trim (not shown in FIG. 2) is generally provided which projects from the dashboard 6 into the passenger compartment. This trim can also accommodate a heating, ventilation, and air conditioning (HVAC) unit 7.

SUMMARY

The present invention aims to provide a cross-vehicle beam not having at least some of the disadvantages of the prior art. In particular, the invention in at least some embodiments aims to provide a cross-vehicle beam allowing more freedom in the design of the dashboard and passenger compartment of vehicles, particularly motor vehicles.

To this end, the invention in at least some embodiments provides a cross-vehicle beam for a vehicle, comprising a tubular portion extending in a longitudinal direction between a first end, intended to be placed on the driver's side of the vehicle, and a second end, intended to be placed on the passenger's side of the vehicle, the cross-vehicle beam comprising:
- a first brace extending between a first end of the first brace, connected to the tubular portion, and a second end of the first brace, intended to be fixed to a windshield lower crossmember of the vehicle body, and
- a second brace extending between a first end of the second brace, connected to the tubular portion, and a second end of the second brace, intended to be fixed to a bulkhead of the vehicle body,
the first ends of the first and second braces being located in the same transverse plane of the tubular portion.

Thus, advantageously, the cross-vehicle beam can be attached only to the bulkhead and windshield lower crossmember of the motor vehicle. In this case, no brace is to be provided that is facing the passenger compartment. This therefore reduces the volume occupied by the cross-vehicle beam. It is then no longer necessary to provide corresponding trim, projecting into the passenger compartment.

According to preferred embodiments, the cross-vehicle beam has one or more of the following features, alone or in combination:
- the cross-vehicle beam comprises a third brace, extending between a first end of the third brace, connected to the tubular portion, and a second end of the third brace, intended to be fixed to the windshield lower crossmember of the vehicle body;
- the cross-vehicle beam comprises another brace, extending between a first end of said another brace connected to the tubular portion, and a second end of said another brace intended to be fixed to the bulkhead of the vehicle body;
- the first ends of the third brace and said another brace are located in the same transverse plane of the tubular portion;
- the cross-vehicle beam has no brace intended to be fixed to the floor of the vehicle body;
- the first ends of the first and second braces are located at a distance, from the first end of the tubular portion, of between one-quarter and one-half of the length of the tubular portion;
- the first end of the third brace and/or the first end of said another brace is located at a distance, from the first end of the tubular portion, of between one-half and three-quarters of the length of the tubular portion; and
- at least one, preferably all, among the first brace, the second brace, the third brace, and said another brace are adapted to be fixed between their first and second ends to a ventilation unit of the vehicle.

According to another aspect, the invention also relates to a vehicle dashboard assembly comprising a dashboard and a cross-vehicle beam as described above in all its combinations, the dashboard being fixed to the cross-vehicle beam.

The dashboard assembly may further include an HVAC unit in a housing, wherein:
- at least one, preferably all, among the first brace, the second brace, the third brace, and said another brace are fixed, between their first and second ends, to the housing of the ventilation unit; and/or wherein
- the housing of the ventilation unit forms at least one, preferably all, among the first brace, the second brace, the third brace, and said another brace.

According to yet another aspect, the invention relates to a vehicle comprising a body with a bulkhead and a windshield lower crossmember, a body style defining a passenger compartment for occupants of the vehicle, and a dashboard assembly as described above in all its combinations, such that the cross-vehicle beam is fixed to the bulkhead and windshield lower crossmember of the vehicle body.

BRIEF DESCRIPTION OF DRAWINGS

Other features and advantages of the invention will be apparent from the following description of some non-limiting exemplary embodiments, with reference to the accompanying drawings.

In the drawings.

DETAILED DESCRIPTION

In the various figures, the same references designate elements that are identical or of identical function. Only the differences between the various examples presented are described in detail.

Figure 1:
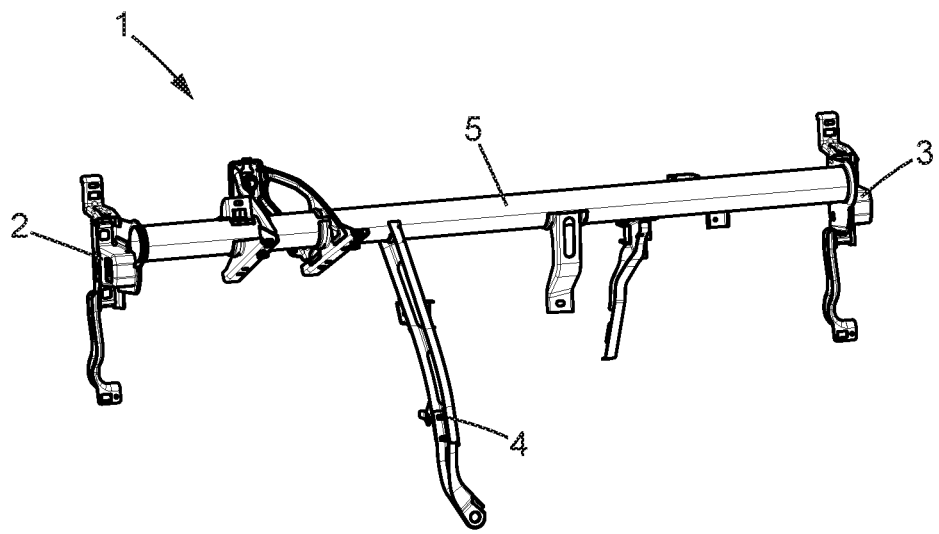
FIG. 1 is a perspective view of a known first example of a cross-vehicle beam for a motor vehicle.
Figure 2:
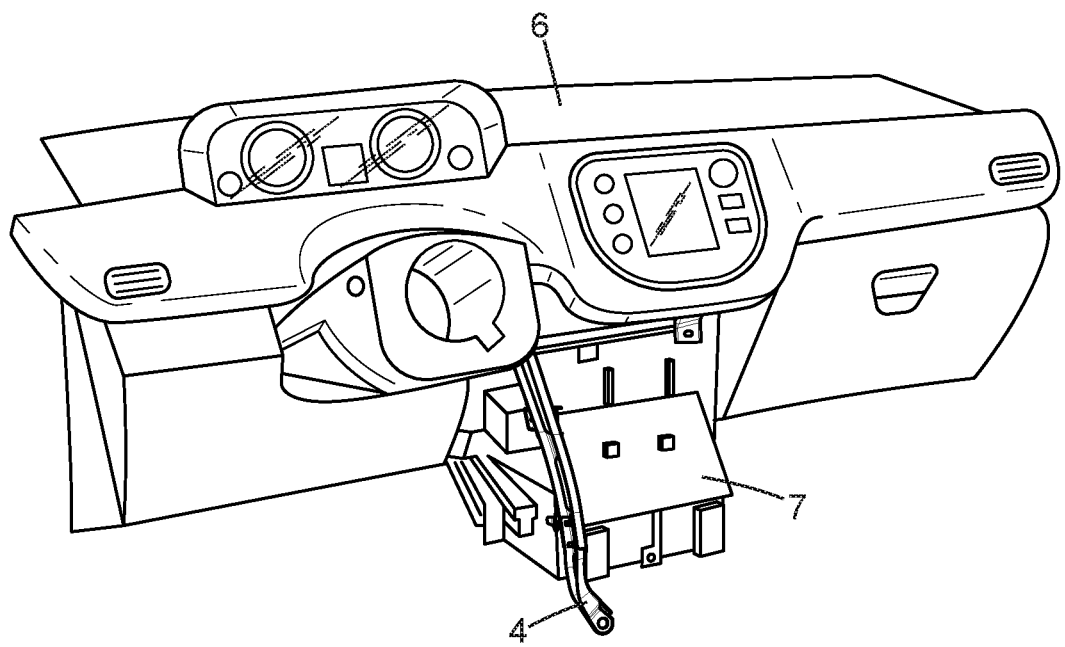
FIG. 2 is a perspective view of a dashboard assembly including the cross-vehicle beam of FIG. 1.
Figure 3:
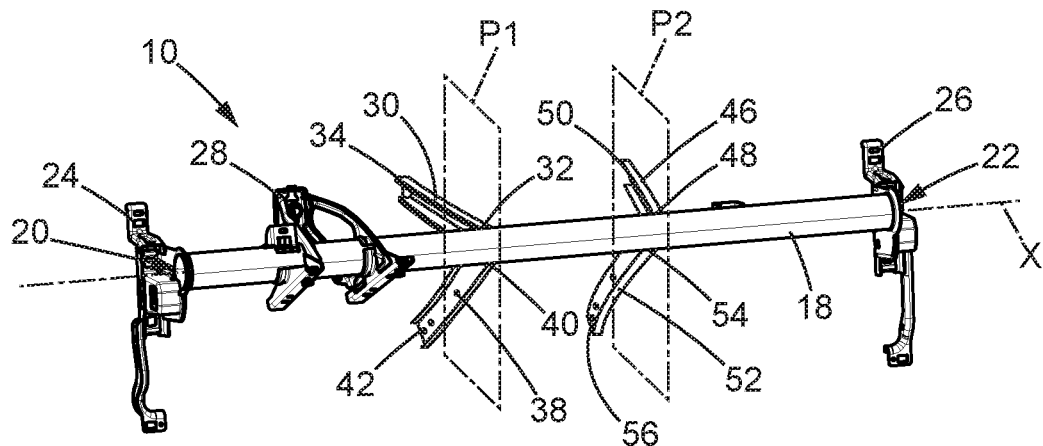
FIG. 3 is a schematic perspective view of another example of a cross-vehicle beam.

FIG. 3 shows a cross-vehicle beam 10 for a motor vehicle. This cross-vehicle beam 10 may be of metal, plastic, or composite material. In particular, the cross-vehicle beam 10 may be made of plastic loaded with glass fibers and/or carbon fibers. The cross-vehicle beam 10 is intended to form a structural element of the dashboard 12 of the motor vehicle 14. The cross-vehicle beam 10 is intended in particular to stiffen the body 16 of the motor vehicle 14 and/or to support equipment of the motor vehicle 14, in particular the dashboard 12 and/or a steering column and/or air ducts of an HVAC system for the passenger compartment of the motor vehicle.

The cross-vehicle beam 10 may be made as one piece. However, alternatively, it is made of multiple pieces.

Figure 4:
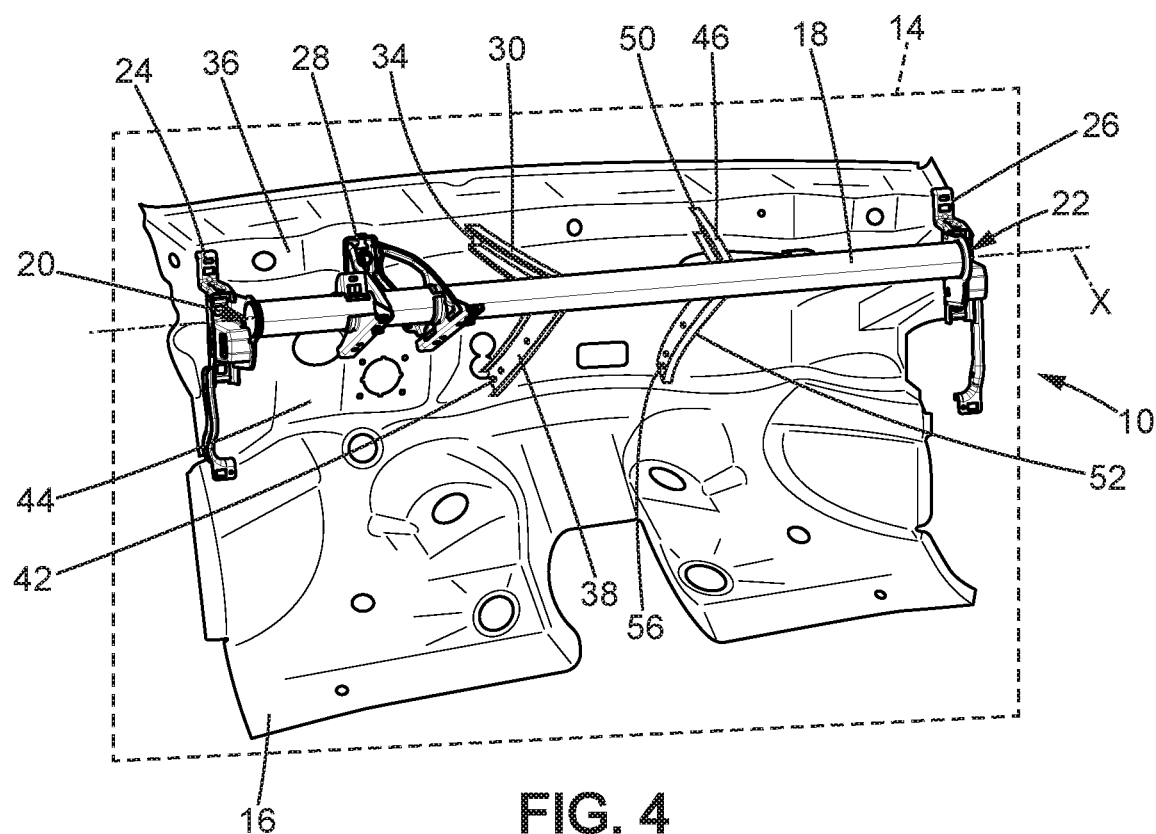
FIGS. 4 and 5 illustrate an example attachment of the cross-vehicle beam of FIG. 3 to the body of a motor vehicle, respectively in perspective and plan views.
Figure 5:
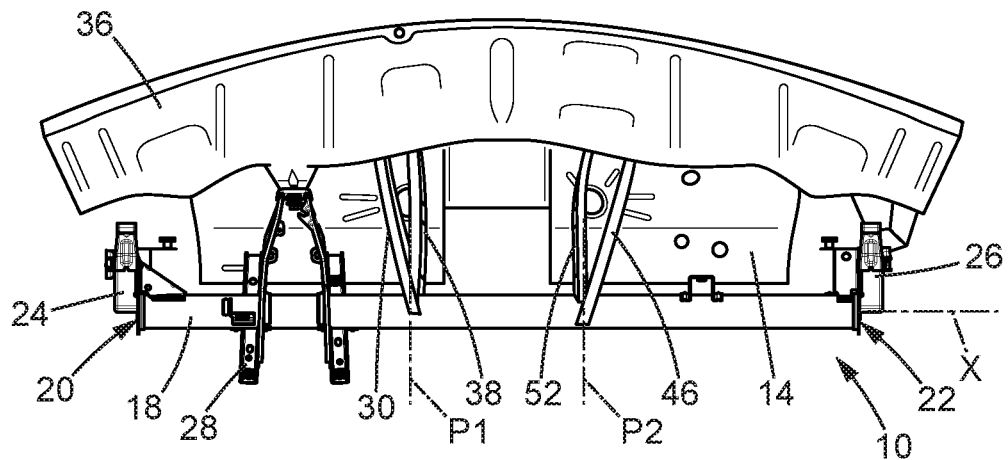
Figure 6:
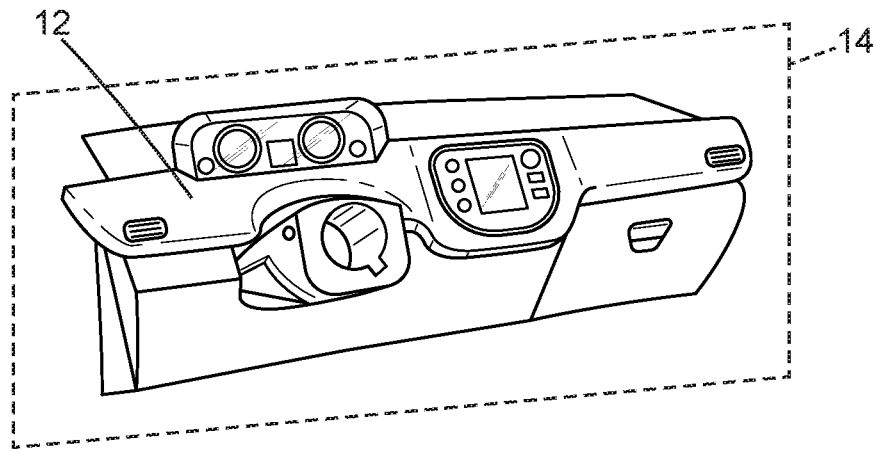
FIG. 6 illustrates a dashboard assembly including the dashboard of FIG. 3.

The cross-vehicle beam 10 comprises a tubular portion 18. This tubular portion 18 extends in a longitudinal direction X between first 20 and second 22 ends of the tubular portion 18. Here, the tubular portion is one piece. Alternatively, however, the tubular portion is formed in multiple pieces, in particular in sections. The first end 20 of the cross-vehicle beam 10 is intended to be fixed to the body 16 of the motor vehicle 14 on the driver's side of the motor vehicle 14. In contrast, the second end 22 of the cross-vehicle beam 10 is intended to be fixed to the body 16 of the motor vehicle 14 on the passenger's side of the motor vehicle 14. In particular, the first 20 and second 22 ends of the cross-vehicle beam 10 are for example fixed, as shown in FIGS. 4 and 5, to the lateral uprights of the body 16 of the motor vehicle 14. Here, at each of its ends 20, 22, the cross-vehicle beam 10 is provided with a bracket 24, 26 for this attachment.

One will recall here that the body of a motor vehicle comprises, from front to rear, an engine compartment which is closed by a hood and which is separated from the passenger compartment of the vehicle by a bulkhead, and in the upper portion by a windshield lower crossmember. The windshield lower crossmember may be integral with the bulkhead. The windshield lower crossmember then differs from the bulkhead because it extends substantially horizontally while the bulkhead extends more vertically or obliquely but in the vertical direction. The windshield lower crossmember is intended to support the lower portion of the windshield.

On the first half of the tubular portion 18, which extends between the first end 20 of the tubular portion 18 and the middle of the tubular portion 18, the cross-vehicle beam 10 is provided with a steering column support 28.

Near the first end 20 of the cross-vehicle beam 10, a first brace 30 (or reinforcement rod) extends between a first end 32 of the first brace 30, connected to the tubular portion 18, and a second end 34 of the first brace 30. This second end 34 of the first brace 30 is intended to be fixed to the body 16 of the motor vehicle 14, in particular to the windshield lower crossmember 36 of the body 14 of the motor vehicle 14.

"Near the first end" is understood here to mean that this first brace 30 is closer to the first end 20 than to the second end 22 of the cross-vehicle beam 10.

Again near the first end 20 of the cross-vehicle beam 10, a second brace 38 extends between a first end 40 of the second brace 38, connected to the tubular portion 18, and a second end 42 of the second brace 38. This second end 42 of the second brace 38 is intended to be fixed to the body 16 of the motor vehicle 14, in particular to the bulkhead 44 of the body 14 of the motor vehicle.

The first brace 30 and/or the second brace 38 may be flat. In particular, the first brace 30 and/or the second brace 38 may extend substantially in a transverse plane of the tubular portion 18, defined with respect to the longitudinal direction X of the tubular portion 18. Alternatively, the first brace 30 and/or second brace 38 extend out of a transverse plane of the cross-vehicle beam 10.

The first and second braces 30, 38 are preferably independent. In other words, the first and second braces 30, 38 do not have common parts, each of the first and second braces 30, 38 extending linearly between its first and second ends 32, 34, 40, 42 without contact with each other. In particular, the first ends 32, 40 of the first and second braces 30, 38 are distinct. However, these first ends 32, 40 of the first and second braces 30, 38 are within the same transverse plane P1 of the tubular portion 18. In other words, these first ends 32, 40 of the first and second braces 30, 38 are located substantially at the same distance from the first end 20 of the tubular portion 18 of the cross-vehicle beam 10. However, these first ends 32, 40 of the first and second braces 30, 38 are offset angularly on the periphery of the tubular portion 18. Thus, when the first and second braces 30, 38 are flat, these first and second braces 30, 38 can extend in the same transverse plane P1 of the tubular portion 18. However, in the example shown and as is more particularly visible in FIG. 5, the first and second braces 30, 38 are curved here so as to extend out of the plane P1. As illustrated, the concavities of the first and second braces 30, 38 can then be opposite one another. Here, these concavities are opposite one another so that in a top view, the first and second braces 30, 38 substantially form a "V".

As illustrated in FIGS. 3 to 6, the first and second braces 30, 38 are such that their first ends 32, 40 are at a distance from the first end 20 of the tubular portion 18, a distance which is between one-quarter and one-half of the total length of the tubular portion 18. The length of the tubular portion 18 is measured along the longitudinal direction X.

In the example of FIGS. 3 to 6, a third brace 46 is provided. This third brace 46 extends between a first end 48 of the third brace 46, connected to the tubular portion 18, and a second end 50 of the third brace 46. This second end 50 of the third brace 46 is fixed, as shown in FIG. 4, to the body 16 of the motor vehicle, in particular to the windshield lower crossmember 36 of the body 16 of the motor vehicle 14.

The first end 40 of this third brace 46 is located near the second end 22 of the tubular portion 18, in other words closer to this second end 22 than to the first end 20 of the tubular portion 18.

Similarly to the first and second braces 30, 38, the third brace 46 may be flat. In particular, the third brace 46 may extend in a plane transverse to the longitudinal direction X of the tubular portion 18. Conversely, as an alternative and as illustrated in FIGS. 3 to 6, the third brace 46 is curved so as to extend out of a plane transverse to the longitudinal direction X of the tubular portion 18.

In the example illustrated in FIGS. 3 to 6, additionally, another or fourth brace 52 is provided. This fourth brace 52 extends between a first end 54 of the fourth brace 52, connected to the tubular portion 18, and a second end 56 of the fourth brace 52. This second end 54 of the fourth brace 52 is fixed, as shown in FIG. 4, to the body 16 of the motor vehicle, in particular to the bulkhead 44 of the body 16 of the motor vehicle 14.

The first end 54 of this fourth brace 52 is located near the second end 22 of the tubular portion 18, in other words closer to this second end 22 than to the first end 20 of the tubular portion 18.

The fourth brace 52 may be flat. In particular, the fourth brace 52 may extend in a plane transverse to the longitudinal direction X of the tubular portion 18. Conversely, as an alternative and as illustrated in FIGS. 3 to 6, the fourth brace 52 is curved so as to extend out of a plane transverse to the longitudinal direction X of the tubular portion 18.

In addition, similarly to the first and second braces 30, 38, the first ends 48, 54 of the third and fourth braces 46, 52 are advantageously located in a same transverse plane P2 defined with respect to the longitudinal direction X of the tubular portion 18. In other words, these first ends 48, 54 of the third and fourth braces 46, 52 are located at the same distance from the first end 20 of the tubular portion. This distance is for example between one half and three-quarters of the total length of the tubular portion 18.

As illustrated in FIGS. 3 to 6, the third and fourth braces 46, 52 are curved so as to extend out of a plane transverse to the longitudinal direction X of the tubular portion 18. More specifically, the concavities of the third and fourth braces 46, 52 are opposite one another so that these third and fourth braces 46, 52 substantially form a "V" in a top view (see FIG. 5).

Advantageously, as illustrated in FIGS. 3 to 6, the cross-vehicle beam 10 has no brace to be fixed to the floor of the body 16 of the motor vehicle 14, in particular to a tunnel of the floor of the body 16. The tunnel of the floor of the body 16 is the portion having a cross-section that is substantially a downward facing U formed in the floor of the body 16 in order to receive one or more exhaust pipes and/or a transmission shaft. It is thus possible to obtain a passenger compartment defined by the body style of the motor vehicle, as partially illustrated in FIG. 6, in which no trim is projecting from the dashboard 12.

Figure 7:
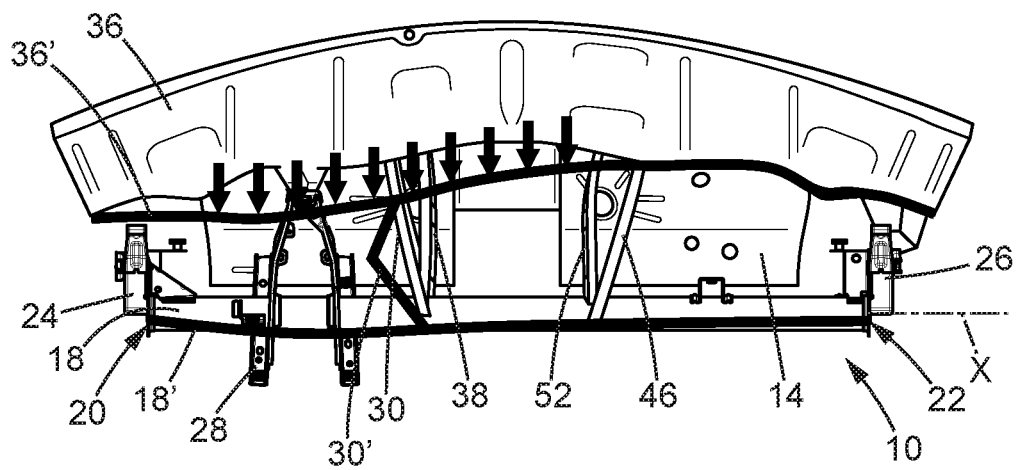
FIG. 7 is a schematic top view of deformations of the cross-vehicle beam of FIG. 3 and of the body to which it is fixed, in case of frontal impact, FIGS. 8 and 9 each illustrate a variant attachment of the cross-vehicle beam of FIG. 3.

FIG. 7 illustrates deformations of the cross-vehicle beam 10 in the event of a frontal impact. As indicated in the introduction to the present application, the cross-vehicle beam 10 is a structural element whose deformations must be restricted in the event of a frontal impact, in order to limit deformations of the dashboard 12 into the passenger compartment. Such deformations are particularly dangerous for the occupants of the motor vehicle.

However, in the absence of a brace attached to the floor of the body of the motor vehicle, the cross-vehicle beam is inherently more easily deformable. One solution to stiffen this cross-vehicle beam would be to increase its weight. It turns out that it is necessary to increase this weight by about a third to obtain equivalent performance in case of an impact. Such a weight increase is not acceptable, of course.

In the case of the example illustrated in FIG. 7, the braces 30, 38 or even 46, 52 allow obtaining acceptable deformation results for the cross-vehicle beam 10. To do so, it may be advantageous to strengthen the body near the points of attachment of these braces 30, 38, 46, 52 to the body 16. In particular, the thickness of the body 16 may be increased near these attachment points. The thickness of the body 16 may in particular be increased by forming beads, ribs, or any other type of relief accessible to those skilled in the art.

In the case of a frontal impact, as illustrated in FIG. 7, the windshield lower crossmember 36 may be deformed as represented by shape 36'. In this case, the braces are deformed, as illustrated in particular by the illustrated shape 30' of the first brace 30. It should be noted that curved braces, which do not lie in a transverse plane of the tubular portion, are more easily deformable. It should also be noted that because the concavities of the braces are opposed, forming a "V" in a top view, these deformations of the braces 30, 38, 46, 52 do not encounter interference, in particular the braces 30, 38, 46, 52 do not come into contact with each other. This optimizes the amount of energy absorbed by the deforming braces 30, 38, 46, 52 and accordingly limits deformation of the cross-vehicle beam 10.

The fact that the first ends of the braces, connected to the tubular portion of the cross-vehicle beam, are in the same respective transverse planes, allows the cross-vehicle beam 10 to better resist indentation. Deformation of the dashboard 10 is illustrated by the shape 18' taken by the tubular portion 18. This deformation remains limited despite the relatively large deformations of the windshield lower crossmember.

Still with the aim of reducing deformations of the cross-vehicle beam 10, it is of interest that the brace pairs are distributed, in particular distributed equally along the length of the tubular portion. The effect is thus better distributed along the length of the tubular portion 18.

Figure 8:
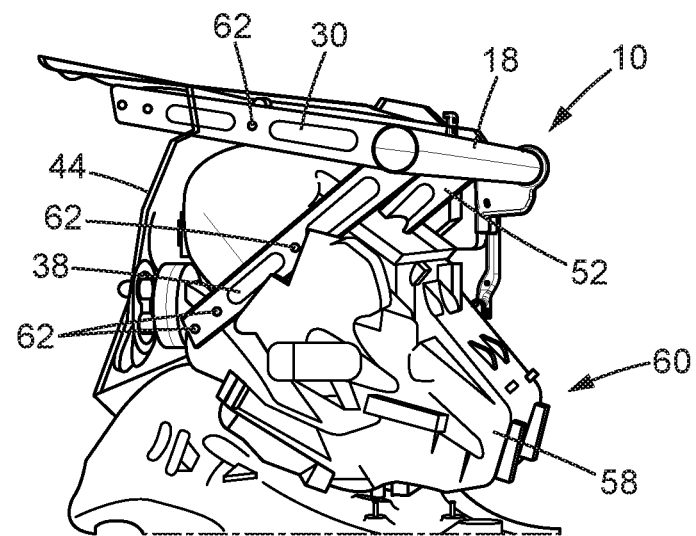

FIG. 8 illustrates a variant of FIGS. 3 to 7, in which the braces 30, 38, 46, 52 are fixed on a housing 58 of an HVAC unit 60. Such an HVAC unit is, in a known manner, adapted to cool and/or heat the air sent into the passenger compartment of the motor vehicle. To do this, the braces 30, 38, 46, 52 have holes 62 between their first and second ends to enable screwing them onto the housing 58 of the HVAC unit 60. Such an assembly stiffens the braces, which contributes to better vibroacoustic performance of the assembly.

Of course, the braces can be fixed to the housing of the HVAC unit using any other fastening means accessible to those skilled in the art.

Figure 9:
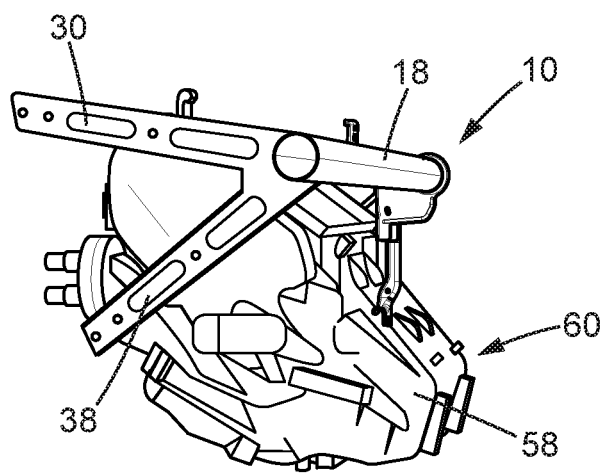

In FIG. 9, the braces 30, 38, 46, 52 are integrated into the housing 58 of the HVAC unit 60. In other words, the housing 58 of the HVAC unit 60 forms the braces 30, 38, 46, 52. In this case in particular, the braces 30, 38, 46, 52 may not be the same piece as the tubular portion 18 of the cross-vehicle beam 10. In other words, the braces 30, 38, 46, 52 may not be integral with the tubular portion 18, but on the contrary may be made separately from the tubular portion 18 and subsequently fixed thereto.

Figure 10:
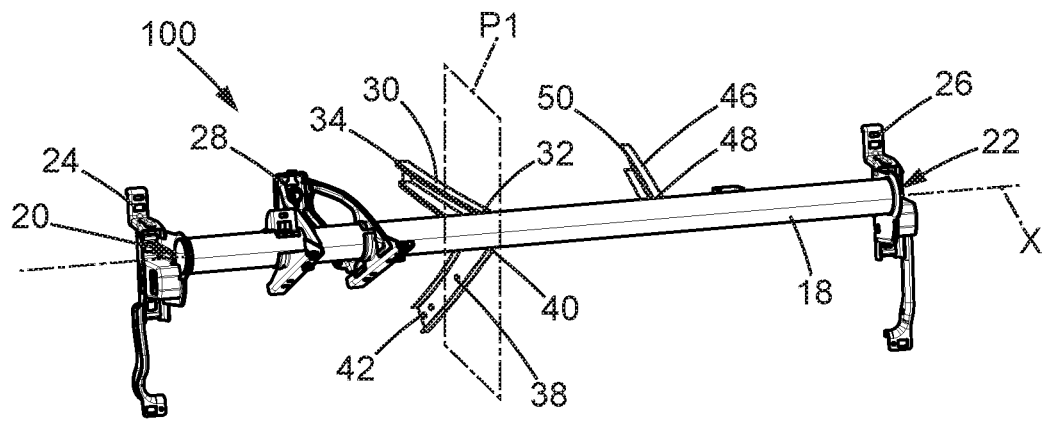
FIGS. 10 and 11 each illustrate another example of a cross-vehicle beam, in a perspective view.

FIG. 10 illustrates a second example 100 of a cross-vehicle beam which differs from the first example only in the absence of the fourth brace 52.

Figure 11:
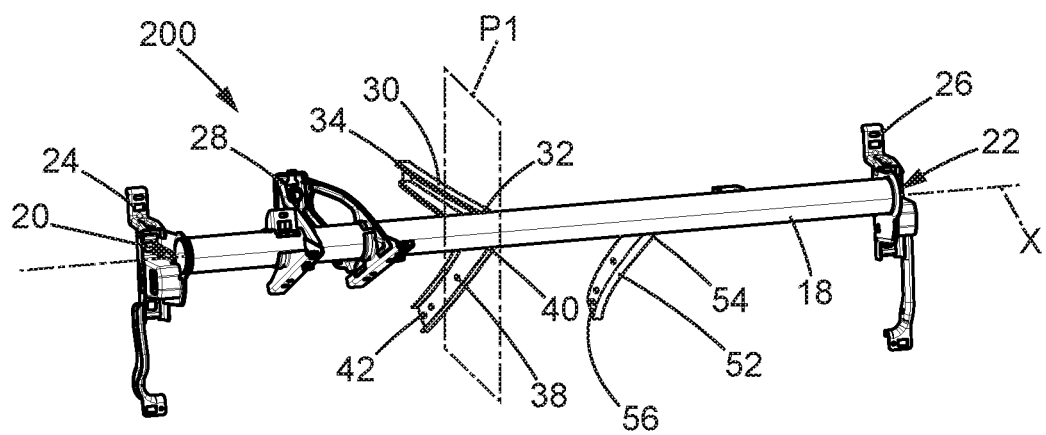

Finally, FIG. 11 illustrates a third example 200 of a cross-vehicle beam which differs from the first example only in the absence of the brace 46 referred to as the third brace in the description of the first example.

The invention is not limited to the exemplary embodiments described above, but instead is capable of numerous variants accessible to those skilled in the art.

In particular, the different variants indicated above can be combined when they are compatible.

In addition, the tubular portion 18 is one piece in the examples described. However, this tubular portion 18 may be made as multiple pieces. These pieces may be made of the same material, or conversely of different materials.

The illustrated examples all show that the support for the steering column is on the left for a left-hand drive vehicle. However, alternatively, this support for the steering column may also be on the right for a right-hand drive vehicle.

Moreover, the braces may be fixed to the body using any appropriate means accessible to those skilled in the art. In particular, the braces may be fixed to the body by welding, screwing, riveting.

Similarly, the braces may be integral with the tubular portion of the cross-vehicle beam. Alternatively, the braces are mounted on the tubular portion. In such case, these braces may be welded, glued, screwed, or riveted to the tubular portion. Any other means of attachment accessible to those skilled in the art may also be used.

The invention claimed is:

1. Cross-vehicle beam for a vehicle, comprising a tubular portion extending in a longitudinal direction between a first end, intended to be placed on a driver's side of the vehicle, and a second end, intended to be placed on a passenger's side of the vehicle, the cross-vehicle beam comprising:
   a steering column support,
   a first brace extending between a first end of the first brace, connected to the tubular portion, and a second end of the first brace, adapted to be fixed to a windshield lower crossmember of a body of the vehicle, and
   a second brace extending between a first end of the second brace, connected to the tubular portion, and a second end of the second brace, adapted to be fixed to a bulkhead of the body of the vehicle,
   wherein the first ends of the first and second braces are located in a same transverse plane of the tubular portion, and
   wherein the first brace and the second brace are located between an entirety of the steering column support and the second end of the tubular portion.

2. Cross-vehicle beam according to claim 1, comprising a third brace, extending between a first end of the third brace, connected to the tubular portion, and a second end of the third brace, intended to be fixed to the windshield lower crossmember of the body of the vehicle.

3. Cross-vehicle beam according to claim 1, comprising another brace, extending between a first end of said another brace connected to the tubular portion, and a second end of said another brace intended to be fixed to the bulkhead of the body of the vehicle.

4. Cross-vehicle beam according to claim 3, comprising a third brace, extending between a first end of the third brace, connected to the tubular portion, and a second end of the third brace, intended to be fixed to the windshield lower crossmember of the body of the vehicle, wherein the first ends of the third brace and said another brace are located in the same transverse plane of the tubular portion.

5. Cross-vehicle beam according to claim 1, having no brace intended to be fixed to the floor of the body of the vehicle.

6. Cross-vehicle beam according to claim 1, wherein the first ends of the first and second braces are located at a distance, from the first end of the tubular portion, of between one-quarter and one-half of the length of the tubular portion.

7. Cross-vehicle beam according to claim 3, comprising a third brace, extending between a first end of the third brace, connected to the tubular portion, and a second end of the third brace, intended to be fixed to the windshield lower crossmember of the body of the vehicle, wherein the first end of the third brace and/or the first end of said another brace is located at a distance, from the first end of the tubular portion, of between one-half and three-quarters of the length of the tubular portion.

8. Cross-vehicle beam according to claim 1, wherein at least one of the first brace and the second brace are adapted to be fixed between their first and second ends to a ventilation unit of the vehicle.

9. Vehicle dashboard assembly comprising a dashboard and a cross-vehicle beam according to claim 1, the dashboard being fixed to the cross-vehicle beam.

10. Vehicle dashboard assembly according to claim 9, further comprising a ventilation unit in a housing, wherein at least one of the first brace and the second brace are fixed, between their first and second ends, to the housing of the ventilation unit, and/or wherein the housing of the ventilation unit forms at least one of the first brace and the second brace.

11. Vehicle comprising a body with a bulkhead and a windshield lower crossmember, a body style defining a passenger compartment for occupants of the vehicle, and a dashboard assembly comprising a dashboard and a cross-vehicle beam, the dashboard being fixed to the cross-vehicle beam, wherein the cross-vehicle beam comprises a tubular portion extending in a longitudinal direction between a first end, placed on a driver's side of the vehicle, and a second end, placed on a passenger's side of the vehicle, the cross-vehicle beam comprising:
   a first brace extending between a first end of the first brace, connected to the tubular portion, and a second end of the first brace, fixed to the windshield lower crossmember of the body of the vehicle, and
   a second brace extending between a first end of the second brace, connected to the tubular portion, and a second end of the second brace, fixed to the bulkhead of the body of the vehicle,
   the first ends of the first and second braces being located in the same transverse plane of the tubular portion.

12. Vehicle according to claim 11, wherein the cross-vehicle beam comprises a third brace, extending between a first end of the third brace, connected to the tubular portion, and a second end of the third brace, fixed to the windshield lower crossmember of the body of the vehicle.

13. Vehicle according to claim 11, wherein the cross-vehicle beam comprises another brace, extending between a first end of said another brace connected to the tubular portion, and a second end of said another brace fixed to the bulkhead of the body of the vehicle.

14. Vehicle according to claim 13, wherein the cross-vehicle beam comprises a third brace, extending between a first end of the third brace, connected to the tubular portion, and a second end of the third brace, fixed to the windshield lower crossmember of the body of the vehicle, wherein the first ends of the third brace and said another brace are located in the same transverse plane of the tubular portion.

15. Vehicle according to claim 11, wherein the cross-vehicle beam has no brace fixed to the floor of the body of the vehicle.

16. Vehicle according to claim 11, wherein the first ends of the first and second braces are located at a distance, from the first end of the tubular portion, of between one-quarter and one-half of the length of the tubular portion.

17. Vehicle according to claim 13, wherein the cross-vehicle beam comprises a third brace, extending between a first end of the third brace, connected to the tubular portion, and a second end of the third brace, fixed to the windshield lower crossmember of the body of the vehicle, wherein the first end of the third brace and/or the first end of said another brace is located at a distance, from the first end of the tubular portion, of between one-half and three-quarters of the length of the tubular portion.

18. Vehicle according to claim 11, comprising a ventilation unit, wherein at least one of the first brace and the second brace are fixed between their first and second ends to the ventilation unit.

19. Vehicle according to claim 11, wherein the dashboard assembly comprises a ventilation unit in a housing, wherein at least one of the first brace and the second brace are fixed, between their first and second ends, to the housing of the ventilation unit, and/or wherein the housing of the ventilation unit forms at least one of the first brace and the second brace.

20. Vehicle according to claim 12, wherein the dashboard assembly comprises a ventilation unit in a housing and wherein:
  one or more of the first brace, the second brace, the third brace, and another brace are fixed, between their first and second ends, to the housing of the ventilation unit; and/or wherein
  the housing of the ventilation unit forms one or more of the first brace, the second brace, the third brace, and another brace.

* * * * *